(12) United States Patent
Silberstein (10) Patent No.: US 8,553,151 B2
(45) Date of Patent: Oct. 8, 2013

(54) VIDEO EFFECT RECALL TECHNIQUE

(75) Inventor: Ralph Andrew Silberstein, Grass Valley, CA (US)

(73) Assignee: GVBB Holdings S.A.R.L., Luxembourg (LU)

( * ) Notice: Subject to any disclaimer, the term of this patent is extended or adjusted under 35 U.S.C. 154(b) by 1253 days.

(21) Appl. No.: 11/990,571

(22) PCT Filed: Sep. 2, 2005

(86) PCT No.: PCT/US2005/031323
§ 371 (c)(1),
(2), (4) Date: Feb. 14, 2008

(87) PCT Pub. No.: WO2007/030096
PCT Pub. Date: Mar. 15, 2007

(65) Prior Publication Data
US 2009/0096929 A1    Apr. 16, 2009

(51) Int. Cl.
*H04N 9/74* (2006.01)

(52) U.S. Cl.
USPC .......... 348/578; 348/659; 348/E05.056; 725/37; 725/38; 725/39; 725/40; 725/41; 725/42; 725/43; 725/44; 725/45; 725/46; 725/47; 725/48; 725/49; 725/50; 725/51; 725/52; 725/53; 725/54; 725/55; 725/56

(58) Field of Classification Search
None
See application file for complete search history.

(56) References Cited

U.S. PATENT DOCUMENTS

| | | | | |
|---|---|---|---|---|
| 5,253,065 A | * | 10/1993 | Richards et al. | 348/579 |
| 5,369,443 A | * | 11/1994 | Woodham | 348/578 |
| 5,384,912 A | | 1/1995 | Ogrinc et al. | |
| 5,608,464 A | | 3/1997 | Woodham | |
| 5,638,133 A | * | 6/1997 | Squier et al. | 348/590 |
| 5,877,781 A | * | 3/1999 | Tomizawa et al. | 345/531 |
| 6,188,800 B1 | * | 2/2001 | Okitsu | 382/276 |
| 6,268,864 B1 | * | 7/2001 | Chen et al. | 345/428 |
| 6,542,692 B1 | * | 4/2003 | Houskeeper | 386/280 |
| 6,804,825 B1 | * | 10/2004 | White et al. | 725/87 |
| 7,024,677 B1 | * | 4/2006 | Snyder et al. | 725/86 |
| 7,177,520 B2 | * | 2/2007 | Zetts | 386/281 |
| 2003/0141665 A1 | * | 7/2003 | Li | 273/440.1 |
| 2004/0005004 A1 | * | 1/2004 | Demos | 375/240.08 |
| 2004/0228605 A1 | * | 11/2004 | Quan et al. | 386/46 |
| 2005/0084232 A1 | * | 4/2005 | Herberger et al. | 386/4 |
| 2008/0016532 A1 | * | 1/2008 | Wang et al. | 725/45 |

OTHER PUBLICATIONS

Search Report Dated May 9, 2006.

* cited by examiner

*Primary Examiner* — Nasser Goodarzi
*Assistant Examiner* — Paul Graham
(74) *Attorney, Agent, or Firm* — Arent Fox LLP (57) ABSTRACT

A video switcher (10) advantageously affords the capability of executing a video effect following recall that avoids visible artifacts upon transitioning from one effect to another. At the outset, the switcher identifies active elements within the video effect, the comprising those elements that undergo a change during execution of the video effect, as opposed to those that remain inert during effect execution. The switcher then dynamically calculates offset for application to an initial key frame value for the video effect to avoid any change in value to active elements upon initial effect recall. The offset value is applied to each subsequent interpolation of the video effect, thereby creating the desired result of applying only relative changes to the active elements of the video effect.

17 Claims, 6 Drawing Sheets

FIG. 9 ial Application PCT/US2005/031323, filed Sep. 2, 2005 published in accordance with PCT Article 21(2) on Mar. 15, 2007 in English.

VIDEO EFFECT RECALL TECHNIQUE

This application claims the benefit, under 35 U.S.C. §365 of International Application PCT/US2005/031323, filed Sep. 2, 2005 published in accordance with PCT Article 21(2) on Mar. 15, 2007 in English.

TECHNICAL FIELD

This invention relates to the recall and execution of a video effect created using a video production device, such as a video switcher.

BACKGROUND ART

A typical television production facility includes at least one video switcher having the capability of switching video input signals from one or more sources, such as cameras, video tape recorders, servers, digital picture manipulators (video effects devices), character generators, and the like, to one or more outputs. Many present day video switchers, such as the Kalypso family of video production switchers manufactured by Thomson Grass Valley Group, have the ability to manipulate one or more input signals to create an effect. Common video effects include fades and wipes, whereas more sophisticated effects include: page turns, page rolls, splits, mirrors, ripples and spheres, as well as size and position modulation. In practice, an operator will first create one or more desired effects for storage to enable subsequent recall. Upon recall, the video effect can undergo mixing with one or more other effects prior to execution.

A video effect comprises at least one, and often a succession of keyframes. Each keyframe corresponds to a storage register that contains data that defines a single set of control settings associated with that effect. The keyframe(s) define all or at least part of the operating state of the switcher. The settings associated with each keyframe undergo storage in an associated memory or register. A typical video switcher has finite number of register locations for storing keyframe settings.

The production and mixing of video effects that undergo live transmission requires a high degree of control to avoid any visible artifacts, such as unexpected pops, flashes, or abrupt changes. Thus, a problem exists in safely transitioning from one effect to another. Generally, operators avoid changing from one effect to another while the video for the contributing channels currently undergoes live transmission. If the state of the first keyframe of the newly recalled effect differs in any way to the current state of the switcher, the output can suddenly "pop" to the new state.

The problem of recalling an effect while enabled channels are on air has been partially addressed by a technique known as effects dissolve. Some present day video switchers afford operators the ability to interpolate from any switcher state to the state of the first keyframe of an effect. However, with the effects dissolve technique, all elements of the video effect undergo interpolation, not just those that undergo change during the video effect. In this way, the current state of the switcher transitions incrementally towards the absolute state of the first keyframe. Thus, effects dissolve does not act like a special function. Also, the effects dissolve takes place prior to the execution of the video effect and thus constitutes an additive behavior to the original effect. Upon reaching the first keyframe, the video effect executes in the traditional way. Moreover, effects dissolve does not support interpolation based upon keyframes, is not reversible, and provides no path controls.

Thus a need exists for technique for recalling a stored effect in a manner that avoids such visual artifacts and overcomes other disadvantages of the prior art.

BRIEF SUMMARY OF THE INVENTION

Briefly, in accordance with a preferred embodiment of the present principles, there is provided a method for executing a video effect following recall, hereinafter referred to as the safe touch technique. At the outset, active elements within the video effect undergo identification. Active elements comprise those elements that undergo a change during execution of the video effect, as opposed to elements that remain inert during effect execution. A dynamically calculated offset is applied to an initial key frame value for the video effect to avoid any change in value to active elements upon initial effect recall. An offset value is applied to each subsequent interpolation of the video effect, thereby creating the desired result of applying only relative changes to the active elements of the video effect, thus avoiding visible artifacts upon transitioning from one effect to another.

DETAILED DESCRIPTION

Figure 1:
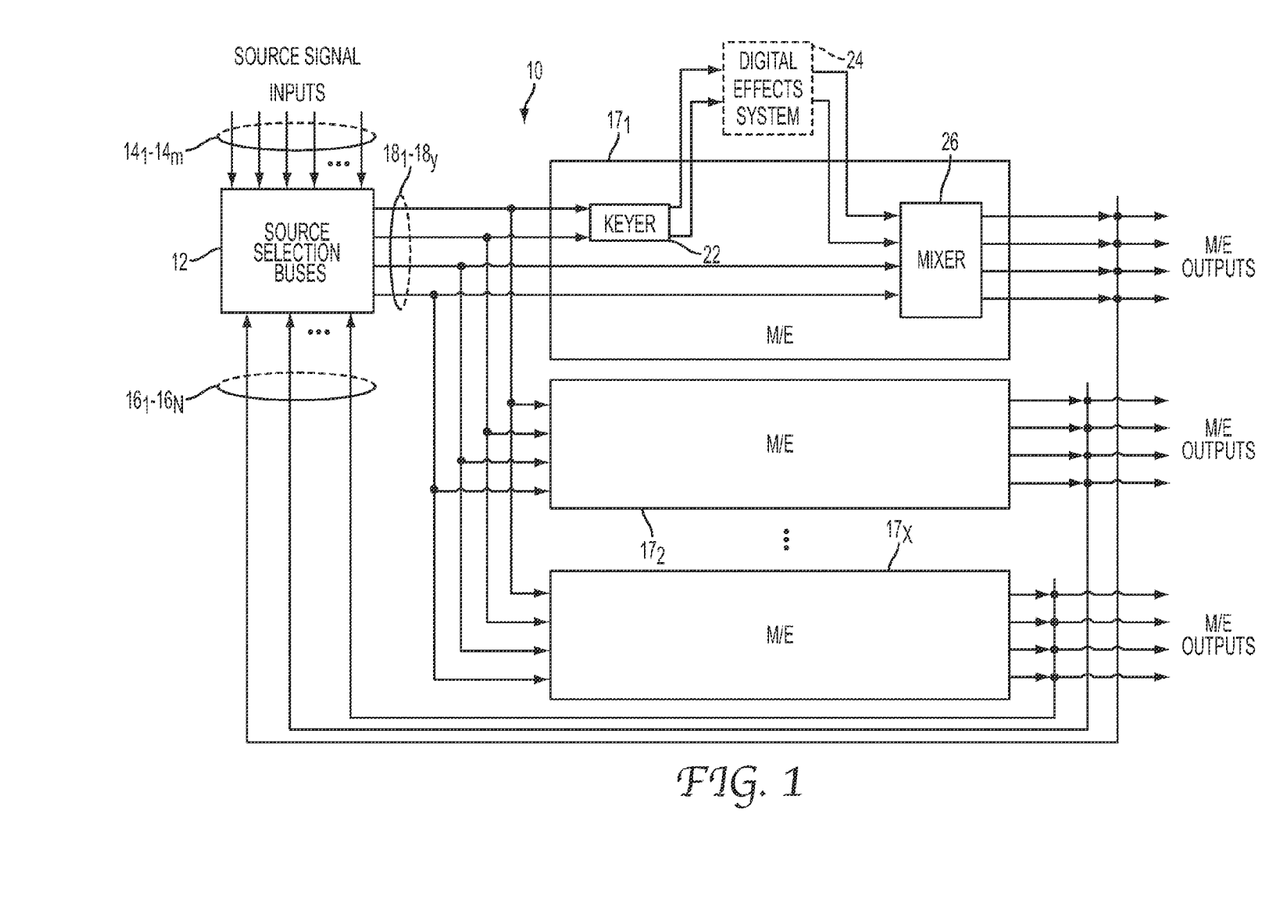
FIG. 1 depicts a block schematic diagram of a video switcher capable of practicing the technique of the present principles.

The safe touch technique of the present principles for recalling a video effect by dynamically adding an offset to a first key frame, and thereafter applying an offset to all subsequent interpolations to avoid creating an artifact, can best be understood by initial reference to FIG. 1 which depicts a simplified block diagram of a video switcher 10 useful for practicing the safe touch technique of the present principles. The switcher 10 includes a switching matrix 12, typically in the form of a cross-point array that enables an operator to select among a plurality of source signal inputs $14_1$-$14_m$, (where m is an integer) and a plurality of mix/effects signals $16_1$-$16_n$ (where n is an integer) output from on a separate one mix effects/banks $17_1$-$17_x$, as discussed in greater detail below.

The switch matrix 12 provides set of video output signals $18_1$-$18_y$ (where y is an integer) for input to the more mix/effects banks $17_1$-$17_x$. Although the video switcher 10 could include an include an infinite number of mix/effect banks, as a practical matter, most present day switchers include no more than four mix/effects banks because of the inability of an operator to physically manipulate a larger number such mix/effects banks.

In the illustrated embodiment, each of the mix/effects backs $17_1$-$17_x$ has the same architecture, although such need not necessarily be the case. For ease of discussion, only the details of the mix/effects bank $17_1$ appear below. The mix/effects bank $17_1$ typically includes at least one keyer 22 that generates a signal to control a downstream device, such as a digital effects system 24 based on selective information contained in an input video signal. The key signal from the keyer 22 enables the digital video effects system 24 to perform different special effects operations, including, but not limited to a key operation whereby an insert video signal replaces a portion of a background scene.

The digital video effects system 24 supplies one or more video signals to a mixer 26 that selectively mixes one or more of such signals with one or more signals from the matrix switch 12. The outputs of the mixer 26 collectively form the output of the mix/effects bank $17_1$, which, along with the outputs of the other mix/effects banks, constitutes the output of the switcher 10. The output of the mix/effects bank $17_1$, along with the output of each of the other mix/effects banks $17_2$-$17_x$, feeds back to the switch matrix 12. In this way, an operator can cascade the mix/effects banks $17_1$-$17_x$ to create a variety of different effects for recall and execution.

The digital effects system 24 associated with the mix/effects bank $17_1$ typically includes one or more memories, (not shown), hereinafter referred to as registers, each storing a setting, hereinafter referred to as a keyframe, associated with the operating state of at least a portion of the switcher 10 for all or at least a part of a video effect. As an example, an effect can include a keyframe that specifies the following parameters: (1) a first source on a first background bus of a mix/effects bank, (2) a second source on a second background bus, a particular transition, such as a wipe, and a particular border. Other types of effects will comprise one or more keyframes with different parameters.

Presently, an operator using a video switcher, such as switcher 10 of FIG. 1, can recall effects while the channel is on air, but only with great care. To do this, an operator will create a pair of effects that are designed to work together. A typical example would include a first effect designed to bring an image on screen, and a second effect designed to take the image off the screen. The operator achieves such a result by programming the second effect to begin in the exact same state as the last keyframe of the first effect. However, the operator cannot make any live adjustments to the image without creating a glitch upon recall of the second effect.

In accordance with the present principles, there is provided a technique, hereinafter referred to as the safe touch technique, which overcomes the aforementioned problem by adapting the video effect to the current state of the video switcher. Upon recall of an effect, the state of the switcher does not change, regardless of the composition of the video effect. Rather, upon execution of the recalled effect, the switcher will output the relative changes of the video effect following interpolation, as opposed to the absolute output of the video effect itself, as was done previously. In this way, only those elements within the video effect that change over the course of executing the video effect become affected.

The safe touch technique of the present principles for achieving recall of a video effect while avoiding artifacts make use of several elementary concepts that can best be understood by defining the following terms. When an operator creates a video effect, the elements associated with the state of the video switcher for that effect typically become "bindable" elements because of the need for such elements to remain bound together. Bindable elements can comprise single values, or, as in the case of the location vector, a bindable element will have multiple values (x, y, and z) that remain bound together during the video effect. Upon creation of an initial keyframe of an effect, the switcher 10 of FIG. 1 creates a "snapshot" (i.e., a record) of the values of all bindable elements. During subsequent keyframes, those elements that undergo a change from the initial snapshot automatically become bound elements by operation of the switcher 10 in the safe touch mode. Elements can become manually bound as well. In any event, only bound elements undergo interpolation. Discrete elements such as Boolean values and integers do not undergo interpolation in the strictest sense, but they are managed in the context of the interpolation process, following special rules, and hence discrete elements become bindable elements as well. When operating a video switcher in the traditional manner, recall of an event triggers the application of the previous snapshot values, followed by recall of the first keyframe, which contains only bound elements. Then, upon execution of the video effect (or reverse execution), just the bound elements undergo interpolation by the switcher 10.

Now, consider operation of the switcher 10 of FIG. 1 in the safe touch mode as discussed above. When operating in the safe touch mode in accordance with the present principles, recall of a video effect does not trigger application of the snapshot values to the current state of the switcher 10. Rather, for each bound element, the switcher 10 determines its current state and calculates an offset from the initial keyframe value. The switcher 10 does not apply the values stored in the first keyframe to the current state values either. In other words, the switcher 10 only captures a new zero point for each bound element from the switcher's current state upon recall of the video effect.

The offset value can be expressed mathematically as:

$$\text{offset} = \text{currentSystemValue} - \text{FirstKeyframeValue} \quad \text{(Equation 1)}$$

When the video effect runs, the switcher 10 performs interpolation in the normal fashion followed by application of the offset value. This resultant value associated with the state of the switcher, (newSystemValue) then undergoes storage by the switcher 10. Equation 2 expresses the mathematical relationship among the new system value (newSystemValue), the offset, as obtained from Equation 1, and the result of the interpolation (interpolationResult).

$$\text{newSystemValue} = \text{interpolationResult} + \text{offset} \quad \text{(Equation 2)}$$

To best understand the safe touch technique, consider the following example, which assumes creation of an effect with a bound element having a first keyframe value of 1.0. Upon recall of that effect when the corresponding current system value equals 3.0, the offset becomes 3.0−1.0=2.0. Subsequently, the value of 2.0 is added to all interpolation results for that bound element. Under such circumstances Equations 1 and 2 enable the switcher 10 of FIG. 1 to produce results for interpolation on a path parallel to the original effect, hereinafter referred to as the safe touch parallel mode.

In some instances, interpolation on a path that converges the changing state to the end state of the original effect will prove more useful. Operating the switcher 10 in a safe touch converge mode will achieve such convergence. Creating results for safe touch converge mode necessitates applying some additional calculations to the interpolation result. Upon recall of the video effect, its duration becomes important. During interpolation, the duration of the video effect will determine an effect position ratio that represents the percentage of the video effect not yet completed. At the beginning of the video effect, the effect position ratio has a value of 1.0 and decreases to a value of 0.0 at the end of the video effect. Rather than use a simple "percent remaining" value (i.e. linear interpolation) for the effect position ratio, the use of an S-Linear interpolation, which produces zero velocity at each end of the effect, affords a smoother start and finish, thus providing better results.

The effect position ratio serves to blend the offset from its full value at the beginning of the video effect to a zero value at the end, causing the effect to smoothly converge to the absolute value of the original effect. The desired convergence results from using the result from Equation 1 and finding the newSystemValue by the following steps:

$$blendedOffset = offset * effectPositionRatio \quad \text{(Equation 3)}$$

$$newSystemValue = interpolationResult + blendedOffset \quad \text{(Equation 4)}$$

Figure 2:
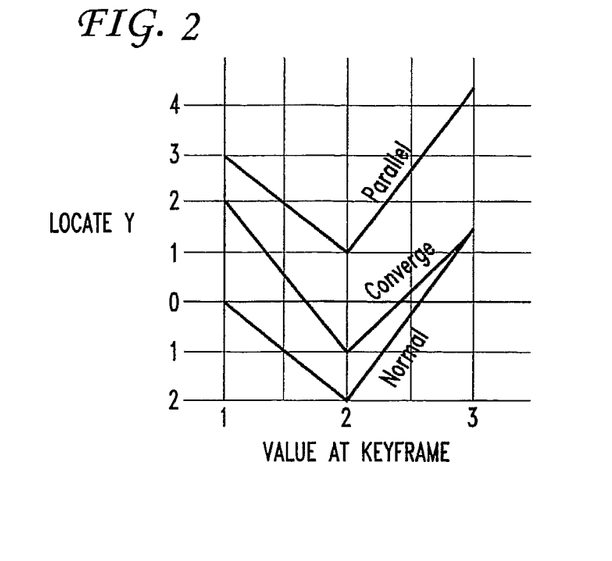
FIG. 2 depicts a graphical relationship between initial key frame values and actual locate values for an exemplary effect when using the traditional effect recall technique, and the safe touch parallel and converge effect recall techniques of the present principles.
Figure 6:
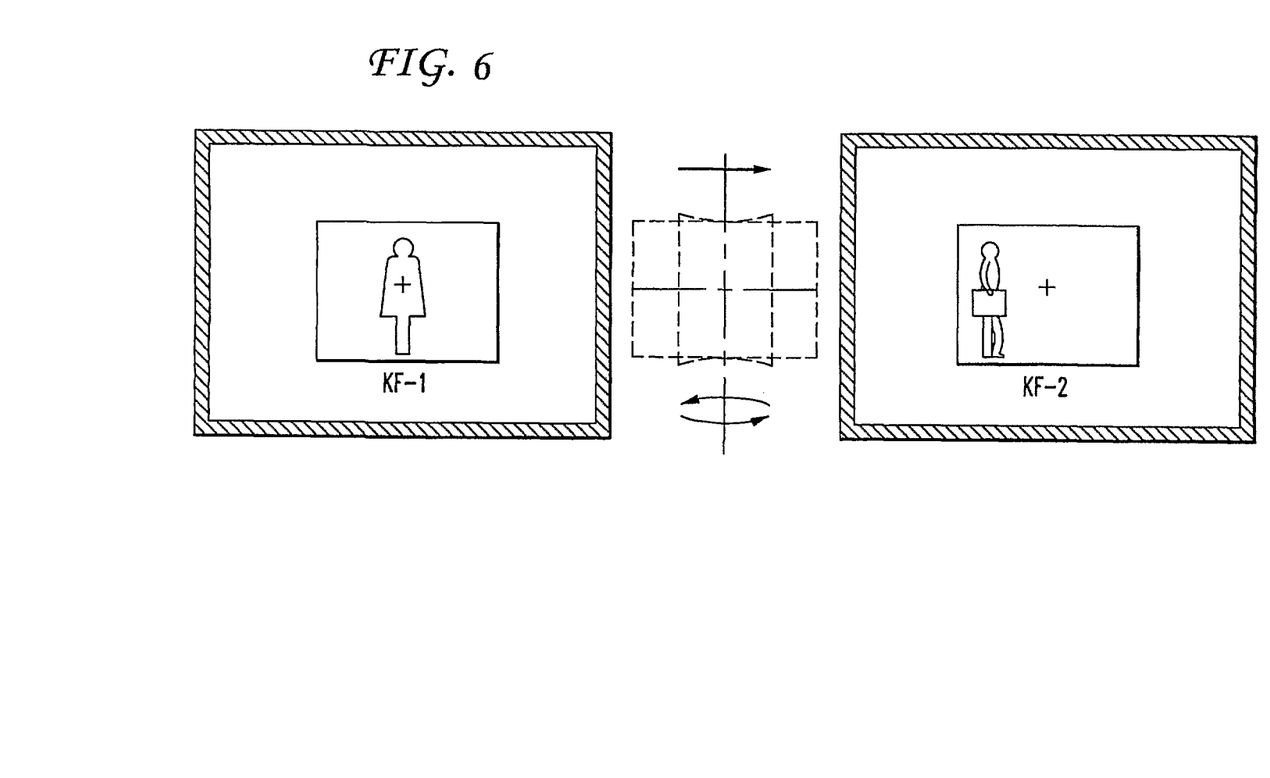

FIG. 2 depicts a graph that compares the results (at the keyframe points only) when using the safe touch technique in the parallel and converge modes for the values for the locate Y element of Effect 5 depicted in FIG. 6, as compared to the traditional recall technique.

As mentioned earlier, bound elements can include discrete elements such as Booleans. Special rules are applied for their behavior when in safe touch mode on a case-by-case basis. In general, discrete values remain inert during the recall and running of a safe touch effect.

To better understand the safe touch technique in accordance with the present principles, consider the following five simple transform engine effects depicted in FIGS. 3-7, respectively. Location values appear as screen units with a 4×3 aspect ratio. Note that creation of each effect occurs by first setting the channel transform engine (not shown) within the switcher 10 to its default values.

Figure 3:
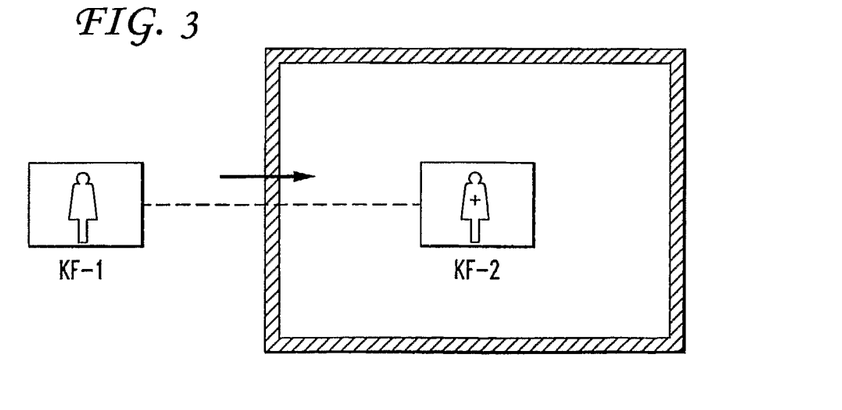
FIGS. 3-9 depict separate simple transform engine effects for the purpose of illustrating the safe touch effect recall technique.
Figure 4:
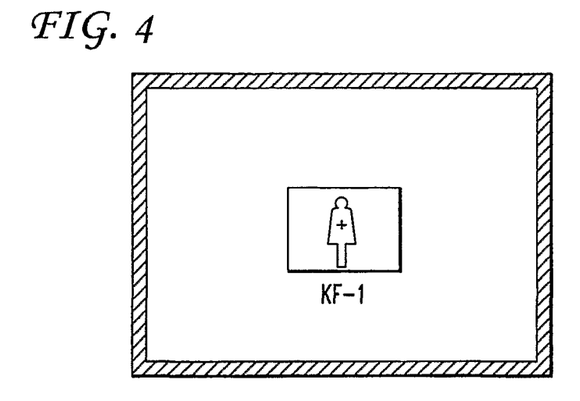
Figure 5:
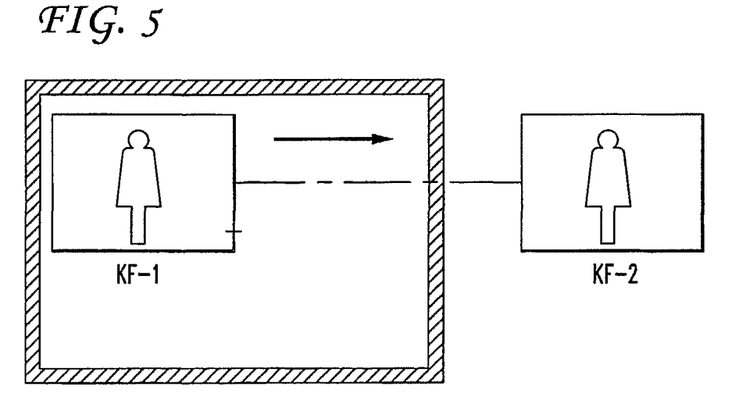
Figure 7:
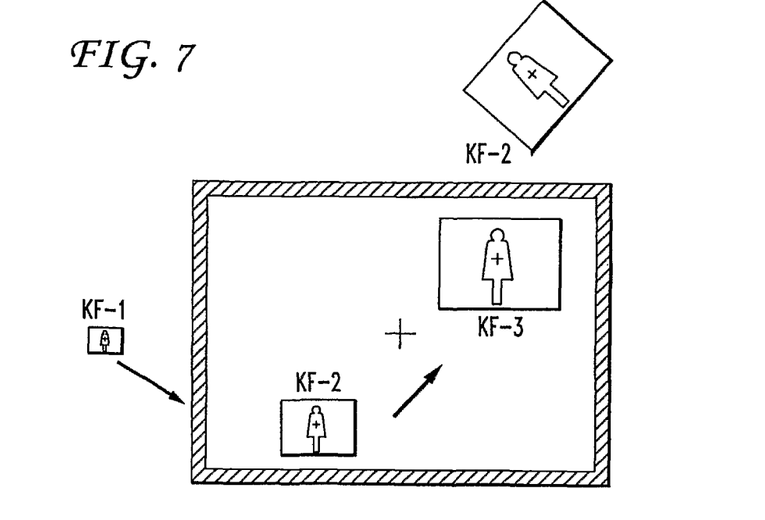

Effect 1: The channel at 30% size undergoes movement on screen from the left as depicted in FIG. 3.
      Keyframe 1 (KF1): locate X=−8.0, size=30%.
      Keyframe 2 (KF2): locate X=0.0.
   Effect 2: Starts with end state of Effect 1 and thereafter, the mage spins off the screen to the right and down as depicted in FIG. 4
      Keyframe 1 (KF1): size=30%.
      Keyframe 2 (KF2): locate X=8.0, locate Y=−6.0, spin Z=1.875.
   Effect 3: The channel is at 50% size and on screen in the upper left. Thereafter, the Image moves off screen to the right as depicted in FIG. 5.
      Keyframe 1 (KF1): locate X=−2.0, locate Y=1.0, size=50%.
      Keyframe 2 (KF2): locate X=8.0.
   Effect 4: The channel rotates about the Y-axis ½ turn, revealing the back source as depicted in FIG. 6.
      Keyframe 1 (KF1): spin X=0.125.
      Keyframe 2 (KF2): spin Y=0.5.
   Effect 5: The channel is 5% size, off screen to the left, and moves in a sweeping path towards the lower left screen and finally ending in upper right at 25% size as depicted in FIG. 7.
      Keyframe 1 (KF1): size=5%, locate X=−6.0.
      Keyframe 2 (KF2): size=25%, locate X=−2.0, locate Y=−2.0.
      Keyframe 3 (KF3): size=25%, locate X=2.0, locate Y=1.5.

To appreciate how the safe touch technique enables an operator to safely transition from one effect to another while the affected channels are on air, first consider the recall and subsequent execution of Effect 1 in the traditional manner (with the safe touch mode off). The channel has a 30% size and appears centered. Now assume the operator wants to move the image off screen using Effect 3. Without safe touch, a recall of Effect 3 would pop the image to the upper left of the screen at size=50%. With the safe touch mode selected, no pop occurs and the video effect works as desired. FIG. 7 shows depicts execution of particular video effect during operation in the safe touch parallel mode. Note that the size of the image remains the same during effect execution, and the only the change that does occur is movement of the image 10.0 units to the right. The original effect appears in dotted lines.

Figure 8:
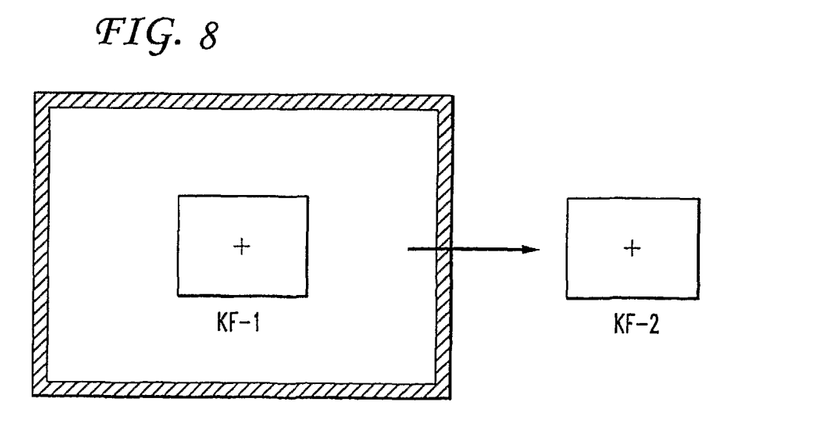

The safe touch technique advantageously enables the use of paired effects on screen after a live adjustment. Assume that Effects 1 and 2 represent a pair of effects for recall by an operator and that the first keyframe of Effect 2 has the same value as the end keyframe of Effect 1. The operator can thus use Effect 1 to bring the channel on screen and then safely use Effect 2 to take it off the screen. For this example, suppose Effect 1 will bring a channel on air and park it at a location centered on the screen at a size=30%. While the video effect 1 runs on air, an operator receives a request to slowly move the image up to reveal some background element. In the past, if the operator attempted that request, running Effect 2 would cause the image to "pop" to the original location before moving off the screen. By entering the safe touch converge mode and recalling Effect 2, the operator can present the desired result, which moves the video effect off screen with no "pop". FIG. 8 depicts the output after recall and running of Effect 2 in the safe touch converge mode.

Figure 9:
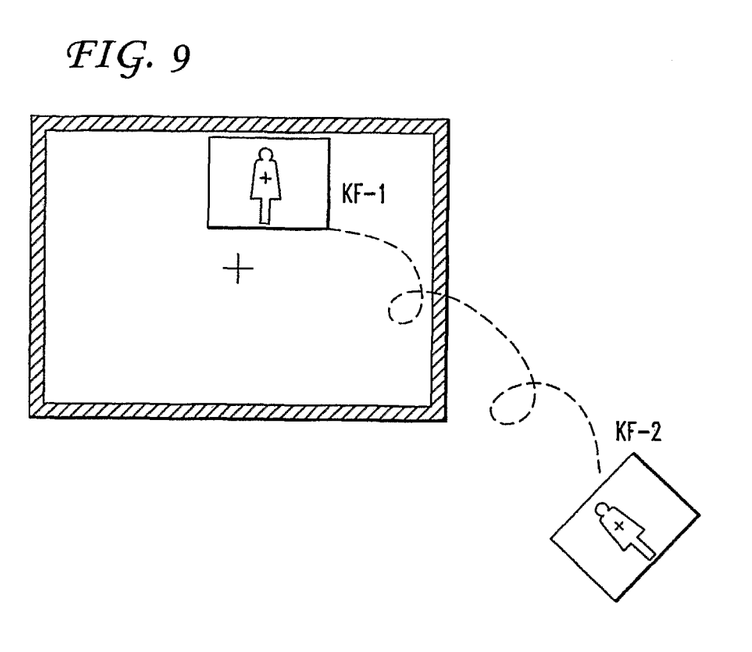

Many possible functions exist functions could beneficial for repeated use by the operator and could be saved with the safe touch mode enabled. For example, consider a simple rotation such as Effect 4, depicted in FIG. 5. When an effect such as this undergoes execution, the only visible change appears as an 180° spin of the channel, regardless of video source, size, location, current rotation, warp mode, crops, or any other states affecting the channel. (This particular function has value when switching sources by placing the next source on the backside.) As an example, consider an image positioned in any fashion on screen. Upon recall of Effect 4 in safe touch parallel mode, the image appears as shown in FIG. 9. Note that with parallel mode, even the starting rotation of the image is preserved by this function.

The safe touch affords other advantages as well. For example, an operator can employ the safe touch mode to create an effect similar to effects dissolve, with the added benefit of being reversible. To do so, an operator manually binds all elements and then creates a 2-keyframe effect. Recalling and running the video effect in safe touch converge mode will then cause all elements to interpolate to the state of the second keyframe.

An operator can use safe touch converge to bring a channel on screen in creative ways, but should understand that the technique can incur a possible difficulty when transitioning form one effect to the other, with the later effect operating the safe touch converge mode. If the later effect does not include the same bound elements as the prior effect, such bound elements in the prior effect will remain unchanged during execution of the later effect.

The foregoing describes a technique for recalling a video effect that applies only relative changes to the active elements of the video effect, thus avoiding visible artifacts upon transitioning from one effect to another.

What is claimed is:
1. A method for executing a video effect following recall, wherein the video effect manipulates an input video signal using elements, the method comprising:
   identifying, within the video effect, at least one active element of the video effect that undergoes an element value change upon execution of an initial key frame of the video effect;
   determining an offset value for each active element of the video effect based on a change between a current value of that active element and the value of that active element stored in the initial key frame of the video effect-upon effect recall; and interpolating each active element upon effect recall and adding the offset value to the interpolation for that element.

2. The method according to claim 1 further comprising the step of determining the offset value in accordance with the arithmetic difference between a current system value and an initial keyframe value.

3. The method according to claim 2 further comprising the step of updating the current system value in accordance with the combination of the interpolation and offset value.

4. The method according to claim 2 further comprising the step of updating the current system value in accordance with a blended offset value.

5. The method according to claim 4 wherein the blended offset value comprises the product of the offset and effect position ratio representing the amount of the effect already executed.

6. The method of claim 1, wherein the video effect comprises at least one of a fade, a wipe, a page turn, a page roll, a split, a mirror, a ripple, and a sphere applied to an input video signal.

7. The method of claim 6, wherein the video effect performs a transition from a first video source on a first background bus of a mix/effects bank and a second video source on a second background bus of the mix/effects bank.

8. The method of claim 1, wherein adding the offset value to the interpolation for each active element of the video effect adapts the video effect to a current state of a video switcher so that the switcher outputs relative changes of the video effect following interpolation.

9. The method of claim 1, wherein each of the elements of the video effect are associated with a state of a video switcher.

10. The method of claim 1, wherein the keyframe defines a set of control settings associated with the video effect.

11. The method of claim 1, wherein the at least one active element comprises an element that undergoes a change during execution of the video effect, as opposed to elements of the video effect that remain inert during effect execution.

12. The method of claim 1, further comprising:
transitioning from a prior video effect to said video effect.

13. A video production device for executing a video effect following recall, wherein the video effect manipulates an input video signal using elements, the video production device comprising:

first means for identifying, within the video effect, at least one active element of the video effect that undergoes an element value change upon execution of an initial key frame of the video effect;

second means for determining an offset value for each active element of the video effect based on a change between a current value of that active element and the value of that active element stored in the initial key frame of the video effect upon effect recall; and means for interpolating each active element upon effect recall and adding the offset value to the interpolation for that element.

14. The video production device 13 wherein second means determines the offset value in accordance with the arithmetic difference between a current system value and an initial keyframe value.

15. The video production device according to claim 14 further comprising means for updating the current system value in accordance with the combination of the interpolation and offset value.

16. The video production device according to claim 14 further comprising means for updating the current system value in accordance with a blended offset value.

17. The video production device according to claim 16 wherein the blended offset value comprises the product of the offset and effect position ratio representing the amount of the effect already executed.

* * * * *